(12) United States Patent
Seo

(10) Patent No.: US 6,714,503 B1
(45) Date of Patent: Mar. 30, 2004

(54) ADAPTIVE RECORDING METHOD AND APPARATUS FOR HIGH-DENSITY OPTICAL RECORDING APPARATUS

(75) Inventor: Jin-gyo Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/623,309
(22) PCT Filed: Apr. 3, 1999
(86) PCT No.: PCT/KR99/00164
§ 371 (c)(1), (2), (4) Date: Nov. 21, 2000
(87) PCT Pub. No.: WO99/52103
PCT Pub. Date: Oct. 14, 1999

(30) Foreign Application Priority Data

Apr. 3, 1998 (KR) .............................................. 98-11893

(51) Int. Cl.[7] .............................................. G11B 7/125
(52) U.S. Cl. .................. 369/59.11; 369/116; 369/13.25
(58) Field of Search .............................. 369/116, 59.11, 369/13.27, 47.51, 59.14, 53.26, 53.36, 13.24, 13.25, 59.12, 47.5, 47.53, 53.3, 13.54

(56) References Cited

U.S. PATENT DOCUMENTS

| | | | |
|---|---|---|---|
| 5,134,606 A | * | 7/1992 | Sekiguchi et al. .......... 369/116 |
| 5,249,172 A | * | 9/1993 | Hagihara et al. ......... 369/47.53 |
| 5,327,411 A | * | 7/1994 | Iwasa et al. ............. 369/59.12 |
| 5,469,422 A | * | 11/1995 | Sohmuta ....................... 369/116 |
| 5,602,814 A | * | 2/1997 | Jaquette et al. ............. 369/116 |
| 5,732,061 A | * | 3/1998 | Kirino et al. ................ 369/116 |
| 5,742,566 A | * | 4/1998 | Imai ........................ 369/13.54 |
| 5,745,463 A | * | 4/1998 | Maegawa et al. ........... 369/116 |
| 5,745,467 A | * | 4/1998 | Sakaue et al. ............... 369/107 |
| 5,848,043 A | * | 12/1998 | Takada et al. .............. 369/53.3 |
| 5,949,747 A | * | 9/1999 | Miyashita et al. ........ 369/53.26 |
| 6,125,085 A | * | 9/2000 | Fuji et al. ................. 369/13.27 |
| 6,288,992 B1 | * | 9/2001 | Okumura et al. ........... 369/47.5 |
| 6,345,026 B1 | * | 2/2002 | Furukawa et al. ........ 369/59.11 |

FOREIGN PATENT DOCUMENTS

| | | |
|---|---|---|
| JP | 63-229637 | 9/1988 |
| JP | 64-76545 | 3/1989 |
| JP | 1-229426 | 9/1989 |
| JP | 11-273076 | 10/1999 |
| KR | 90-15115 | 10/1990 |

* cited by examiner

Primary Examiner—William Korzuch
Assistant Examiner—Kim-Kwok Chu
(74) Attorney, Agent, or Firm—Staas & Halsey LLP

(57) ABSTRACT

An adaptive recording method and apparatus for optimizing power of a laser diode in high density optical recording. The mark size of input NRZI (Non Return to Zero Inversion) data is discriminated and the power of overwrite pulses is varied in accordance with the discriminated mark size, optimizing read power, peak power and bias power for overwrite pulses, to supply optimized pulses to the laser diode.

8 Claims, 4 Drawing Sheets

ADAPTIVE RECORDING METHOD AND APPARATUS FOR HIGH-DENSITY OPTICAL RECORDING APPARATUS

CROSS REFERENCE TO RELATED APPLICATIONS

This application claims the benefit of Korean Application No. 1998-11893, filed Apr. 3, 1998 and Patent Cooperative Treaty Application No. PCT/KR99/00164 filed Apr. 3, 1999, the disclosures of which are hereby incorporated by reference.

BACKGROUND OF THE INVENTION

1. Field of the Invention

The present invention relates to an adaptive recording method and apparatus for a highdensity optical recording apparatus, and more particularly, to an adaptive recording method and apparatus for optimizing power of a laser diode.

2. Description of the Related Art

High-capacity recording media are required in a multimedia age and optical recording apparatuses using the same include magnetic optical disc driver (MODD), digital versatile disc random access memory (DVD-RAM) driver and the like.

These optical recording apparatuses require an optimal system state and precision as the recording density increases. In general, if the recording capacity increases, jitter of an overwrite pulse for a radial tilt increases in a direction of a time axis. Thus, it is very important to minimize the jitter for attaining high-density recording.

FIG. 1 is a block diagram of a conventional optical recording apparatus.

First, a recording waveforn controller 120 controls recording waveforms in accordance with input NRZI data. An overwrite pulse generator 140 generates overwrite pulses in accordance with an control output generated from the recording waveform controller 120. A laser diode driver 150 drives a laser diode 152 in accordance with levels of the overwrite pulses generated from the overwrite pulse generator 140. Also, a gain adjuster 158 adjusts a gain of an optical signal input from a disc 154 through a photodiode (PD) 156. A comparator 160 compares the voltage of a signal output from the gain adjuster 158 with a reference voltage. A counter 170 up/down counts in accordance with the result of the comparator 160. A digital-analog converter (DAC) 180 converts up/down counted values into analog values and applies the converted values to the laser diode driver 150.

FIGS. 2A through 2E are waveform diagrams of overwrite pulses generated from the overwrite pulse generator 140 shown in FIG. 1.

Overwrite pulses of input NRZI (Non Return to Zero Inversion) data having recorded mark sizes of 3T, 5T and 11T, as shown in FIG. 2A, are formed in a state specified in a format book, as shown in FIG. 2E, and then recorded. Here, the NRZI data are divided into marks and spaces. During a period of the spaces, the laser diode is in an erase power state to thus erase existing data. Recorded marks of NRZI data composed of 3T, 4T, . . . , 14T, in which the interval of each T is 1L, are recorded by changing only the size of multi-pulses without changing the numbers of the first pulse, the last pulse and the cooling pulse.

In other words, the waveforms of the overwrite pulse shown in FIG. 2E are formed by the combination of read power (FIG. 2B), peak power, which is also called write power, (FIG. 2C), and bias power, which is also called erase power (FIG. 2D).

The waveform of the overwrite pulses is the same as those of the first generation DVD-RAM standard of 2.6 giga bytes (GB). In other words, according to the 2.6 GB DVD-RAM standard, the waveform of an overwrite pulses consists of the first pulse, multi-pulse chains and the last pulse. The rising edge of the first pulse of the basic overwrite pulses is delayed by T/2 from the rising edge of a recorded mark. The rising edge of the first pulse can be shifted back and forth in units of 1 nano second (ns). The last pulse can also be shifted back and forth in units of 1 ns. The multi-pulse chains are divided into several short pulses to reduce thermal accumulation in the rear portion of the recorded mark, thereby suppressing deformation of recorded marks.

In the structure of such an overwrite pulse, the waveform of overwrite pulses is formed, irrespective of the preceding and following spaces.

Therefore, when forming and recording overwrite pulses formed into a constant power level, as shown in FIG. 2E, jitter may be caused in accordance with input NRZI data, because recorded marks have thermal accumulation occurring in the front or rear portions thereof, or the domain sizes formed depending on the sizes of preceding and following spaces are not constant. This may significantly degrade overall system performance. Also, this makes it difficult to use high-density DVD-RAM, for example, the second generation DVD-RAM of 4.7 GB.

SUMMARY OF THE DISCLOSURE

To solve the above problems, it is an object of the present invention to provide a method for adaptively forming overwrite pulses in accordance with marks or spaces of input NRZI data in a high-density optical recording apparatus.

It is another object of the present invention to provide an apparatus for adaptively forming overwrite pulses in accordance with marks or spaces of input NRZI data in a high-density optical recording apparatus.

To achieve the first object, there is provided an adaptive recording method in a method for optimizing read power, peak power and write power for overwrite pulses and supplying the same to a laser diode, the adaptive recording method comprising the steps of (a) discriminating the mark size of input NRZI data, and (b) varying power of the overwrite pulse in accordance with the discriminated mark size. In step (b), power levels of the laser diode are varied based on levels of the write power controlled an automatic laser power control (ALPC).

According to another aspect of the present invention, there is provided an adaptive recording apparatus in an apparatus for controlling power of a laser diode, the adaptive recording apparatus comprising a discriminator for discriminating the mark size of input data or relationship between preceding and following spaces and outputting different power levels accordingly, a generator for controlling the waveform of overwrite pulses in accordance with the input data to generate overwrite pulses, and a laser diode driver for converting differentiated value between the value of the power level output from the discriminator and a reflected optical signal level into a current signal, and adaptively driving the laser diode in accordance with the mark size.

Additional objects and advantages of the invention will be set forth in part in the description which follows, and, in part, will be obvious from the description, or may be learned by practice of the invention.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT

Figure 1:
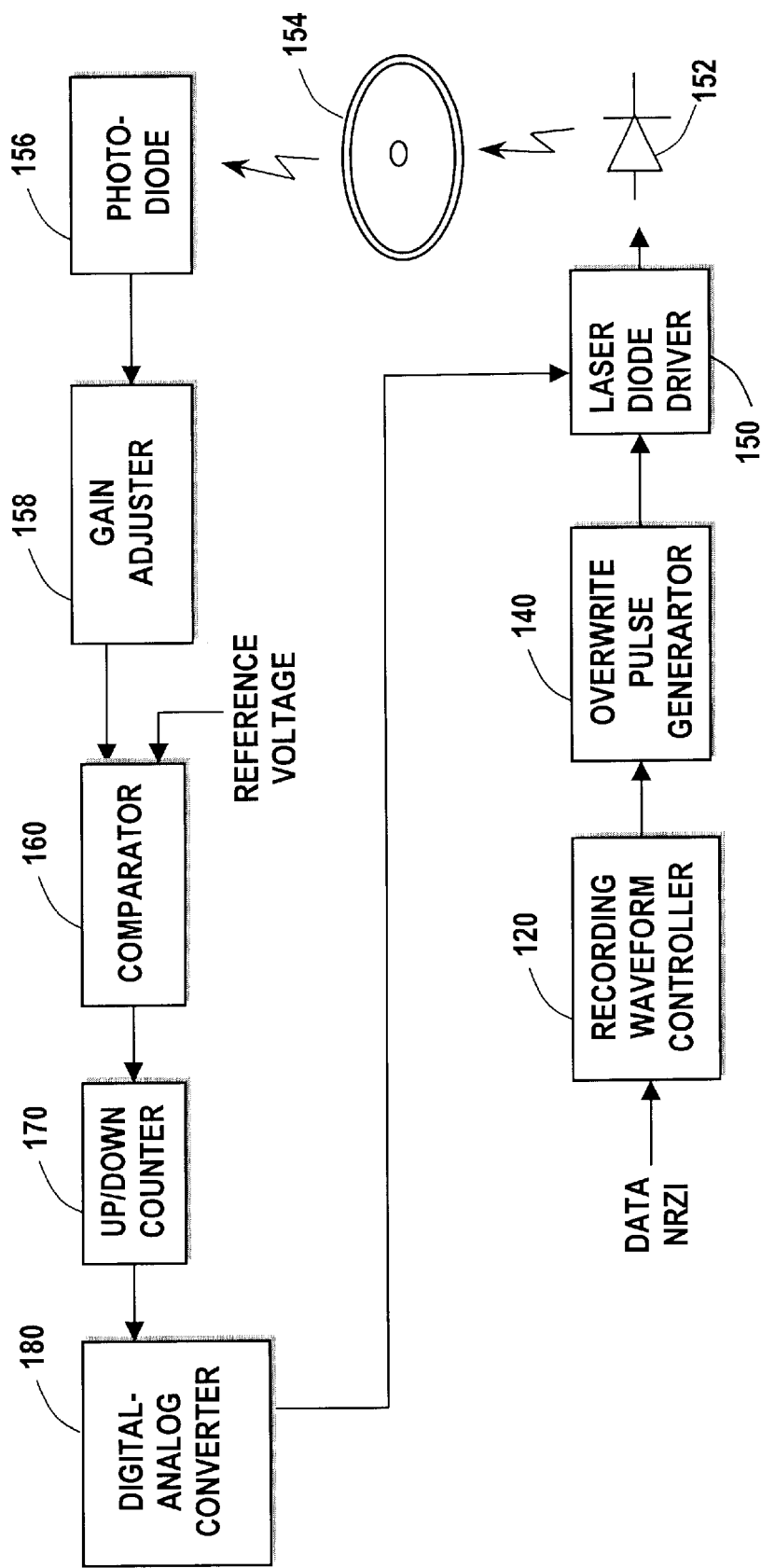
FIG. 1 is a block diagram illustrating a conventional optical recording apparatus.
Figures 2A, 2B, 2C, 2D, 2E:
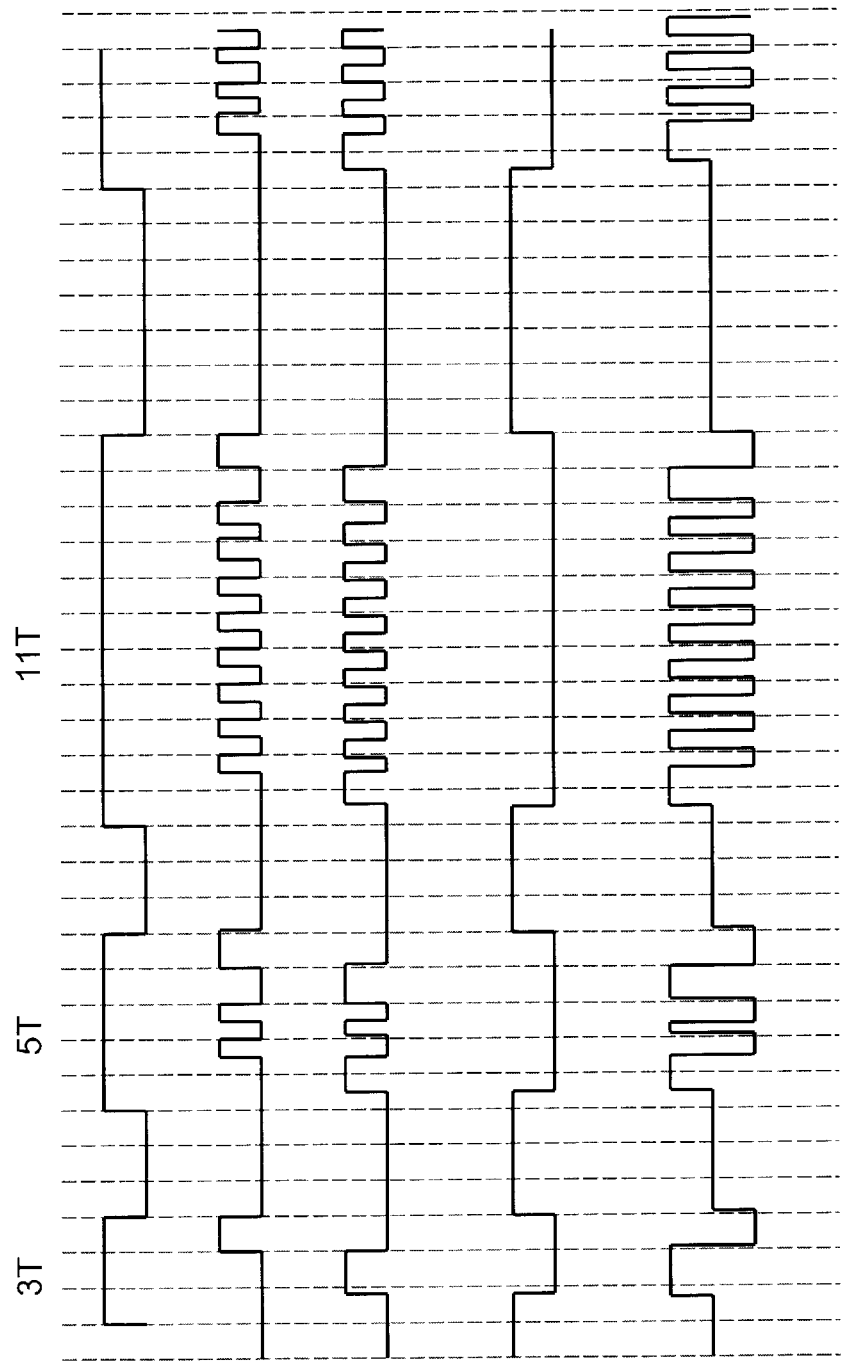
FIGS. 2A through 2E are waveform diagrams of overwrite pulses generated from an overwrite pulse generator shown in FIG. 1.

Reference will now be made in detail to the present preferred embodiments of the present invention, examples of which are illustrated in the accompanying drawings, wherein like reference numerals refer to like elements throughout.

Figure 3:
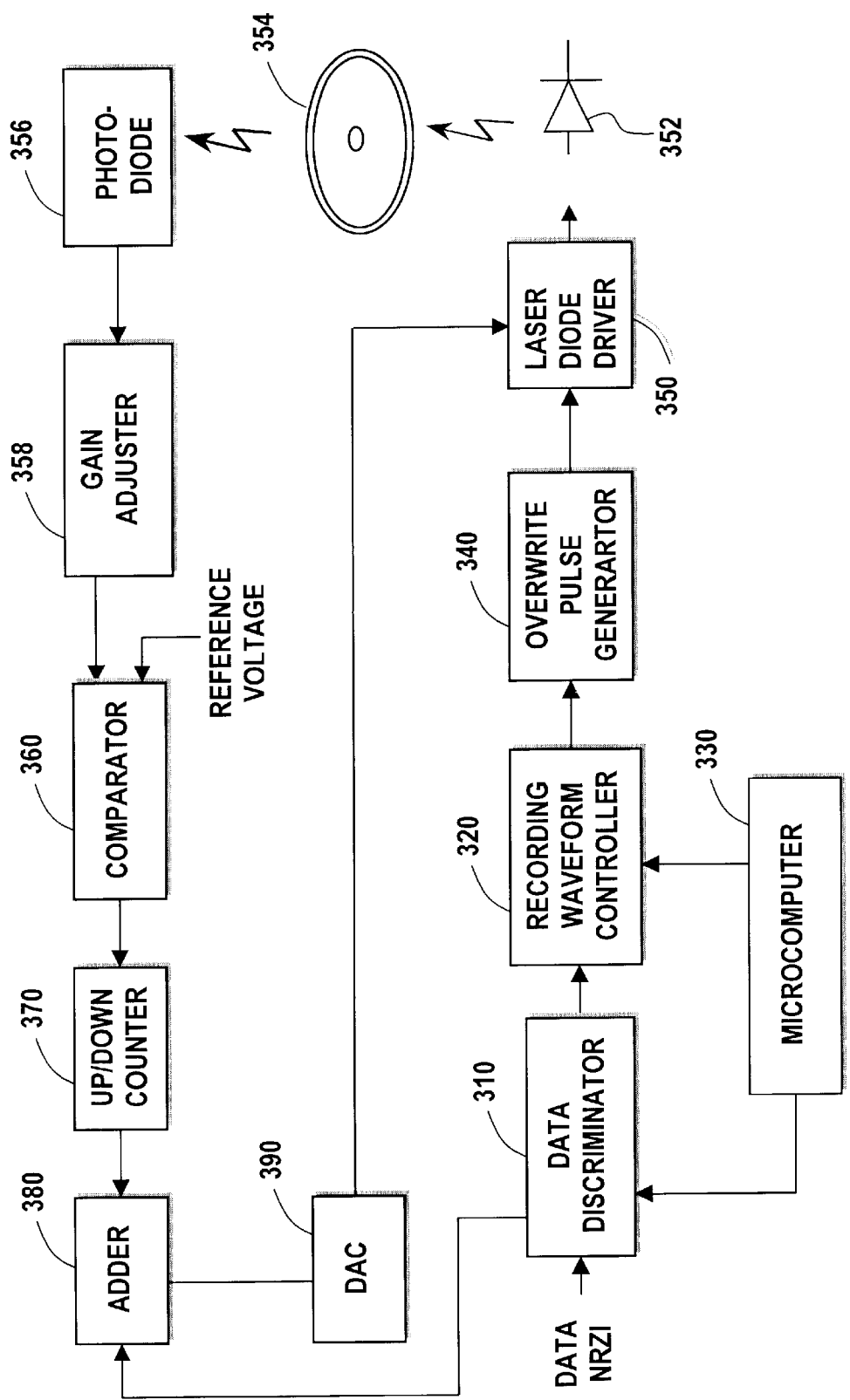
FIG. 3 is a block diagram illustrating an adaptive recording apparatus for a high-density optical recording apparatus according to the present invention.

FIG. 3 is a block diagram of an adaptive recording apparatus for a highdensity optical recording apparatus according to the present invention, which includes a data discriminator 310, a recording waveform controller 320, a microcomputer 330, an overwrite pulse generator 340, a laser diode driver 350, a laser diode 352, a disc 354, a photodiode 356, a gain adjuster 358, a comparator 360, a counter 370, an adder 380, and a DAC 390. Here, the laser diode driver 350, the laser diode 352, the disc 354, the photodiode 356, the gain adjuster 358, the comparator 360, the counter 370, the adder 380, and the DAC 390 are related to a reflected optical signal and perform auto laser-diode control (ALPC).

Figures 4A, 4B, 4C, 4D, 4E, 4F:
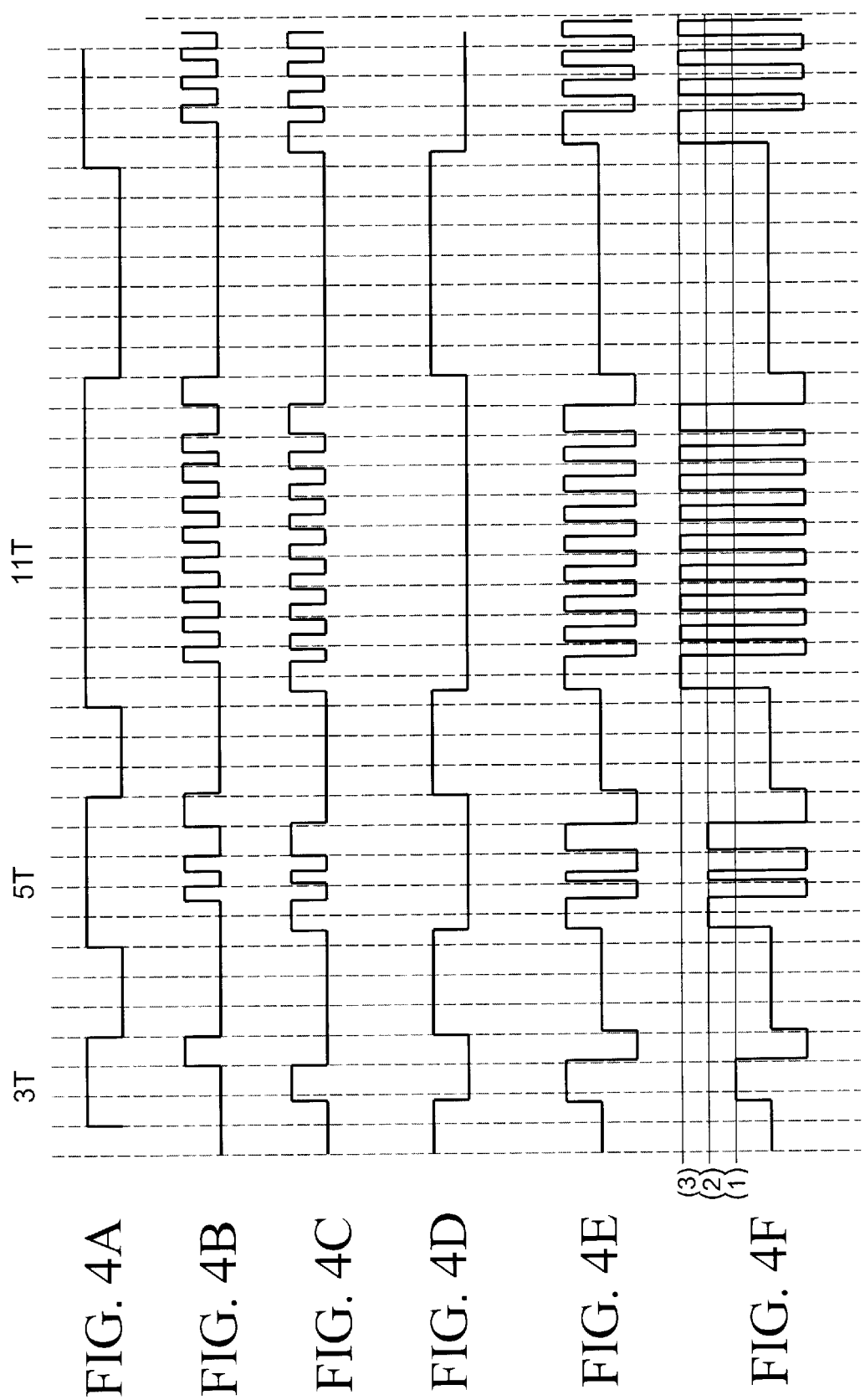
FIGS. 4A through 4F are waveform diagrams of adaptive overwrite pulses recorded by an adaptive recording apparatus shown in FIG. 3.

FIGS. 4A through 4F are waveform diagrams of adaptive overwrite pulses recorded by the adaptive recording apparatus shown in FIG. 3, in which FIG. 4A shows a waveform of NRZI data, FIG. 4B shows read power, FIG. 4C shows peak power (or write power), FIG. 4D shows bias power (or erase power), FIG. 4E shows a waveform of overwrite pulses, and FIG. 4F shows a waveform of overwrite pulses newly added with write powers 1, 2 and 3.

Next, the operation of the apparatus shown in FIG. 3 will be described.

In FIG. 3, the data discriminator 310 having tables in which different optimal power level data for 3T, 4T, . . . 14T are stored for the respective marks depending on the mark size (T) or the relationship between preceding and following spaces receives NRZI data divided into marks and spaces, discriminates the mark size (T) or the relationship between preceding and following spaces and outputs the power level data to the adder 380. Here, the optimal power level data corresponding to the mark size and space size are selected and stored in the form of binary data in the table. The microcomputer 330 sets an initial value of the optimized power level data in the table of the data discriminator 310 in accordance with the mark size or the relationship between preceding and following spaces or initializes the recording waveform controller 320. Also, the microcomputer 330 initializes discriminating conditions and table values of the data discriminator 310 and updates the data into the optimal level data. The recording waveform controller 320 outputs recording waveform control signals, i.e., the read power shown in FIG. 4B, the peak power shown in FIG. 4C and the bias power shown in FIG. 4D, in accordance with the NRZI data input from the data discriminator 310, as shown in FIG. 4A,.

The overwrite pulse generator 340 generates overwrite pulses shown in FIG. 4E in accordance with pulse width data controlling the waveform of the overwrite pulses applied from the recording waveform controller 320 and applies a control signal for controlling the flow of current for each channel (read, peak or bias channel) for the overwrite pulses to the laser diode driver 350.

The laser diode driver 350 converts the driving levels of each input power of read, peak and bias channels into current signals based on a control signal for controlling the current flow for the respective channels output from DAC 390 to drive the laser diode 352. The laser diode 352 applies an optical signal to the disc 354. At the same time, the optical signal reflected from the disc 354 is received in the photodiode 356 which is a light receiving element. The gain adjuster 358 adjusts the voltage level of the optical signal received by the photodiode 356. The comparator 360 compares the voltage level with a reference voltage level. Here, the reference voltage level varies in accordance with an operating mode, i.e., a read mode, an erase mode or write mode. The counter 370 down-counts if the optical signal level is greater than a reference level, and up-counts if the optical signal level is less than the reference level.

The adder 380 differentiates power level data output from the discriminator 310 from the counted value corresponding to the power level for the reflected optical signal generated from the counter 370, and outputs the power level data to be added for the corresponding mark. The DAC 390 converts the power level data output from the adder 380 to a current level for driving the laser diode. The current level corresponds to the current for driving the laser diode and is applied to the laser diode driver 350. Here, the laser diode driver 350, the laser diode 352, the disc 354, the photodiode 356, the gain adjuster 358, the comparator 360 the counter 370, the adder 380, and the DAC 390 form a loop for performing auto laser-diode control (ALPC).

Thus, the write power levels of the last recording waveform applied to the laser diode driver 350 adaptively vary in accordance with mark size (T), as shown in FIG. 4F. The levels denoted by (1), (2) and (3) of FIG. 4F indicate power levels of 3T, 5T and 11T, respectively in FIG. 4F, the y-axis indicates power (mW) and the x-axis indicates time (t). For example, the waveforms of (1), (2) and (3) may be set to 10 mW, 11 mW and 12 mW, respectively. As shown in FIG. 4F, the write power levels are different by a predetermined magnitude in accordance with the sizes of the respective marks, i.e., 3T, 5T and 11T. In other words, the powers of 10 mW, 11 mW and 12 mW are generated at 3T, 5T and 11T, respectively.

Also, if one or arbitrary level of (1), (2) and (3) levels shown in FIG. 4F is set to a reference control level of ALPC, the power levels of the laser diode are adaptively varied by decreasing or increasing the same from the reference control level in accordance with input NRZI data.

As described above, according to the present invention, the size of the domain becomes uniform by varying the output level of the recording pulse waveform according to the size T of the mark of the input NRZI data or the relationship of the proceeding and following spaces. Thus, jitter is minimized and reliability and performance of the system can be improved.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An adaptive recording apparatus for controlling power of a laser diode, comprising:
    a discriminator which discriminates at least one of a mark size and a relationship between preceding and following spaces of input data and accordingly sets a power level;
    a generator which generates an overwrite pulse by controlling a waveform of an overwrite pulse in accordance with the input data;
    an adder which differentiates the power level data corresponding to the mark size output from the discriminator from reflected optical signal level data;
    a digital-analog converter (DAC) which converts the data output from the adder into an analog control current signal; and
    a laser diode driver which drives the laser diode by the analog control current signal supplied from the DAC.

2. An apparatus for overwrite recording of an input waveform on a recording disk, the input waveform having at least a mark, a preceding space and a following space, the apparatus comprising:
    a laser diode which irradiates the recording disk;
    a laser diode driver which applies power to the laser diode in response to a recording waveform and a power level signal;
    a photo diode which detects a reflected light from the recording disk;
    a recording waveform generator which generates the recording waveform based on the input waveform;
    a data discriminator which determines a recording power level based on at least one of the mark size and a relationship between the preceding space and the following space and outputs first power level data;
    a first circuit which compares a power of the reflected light with a reference level and outputs second power level data based on the comparison; and
    a second circuit which receives the first power level data and the second power level data and outputs the power level signal based on first and second power level data.

3. The apparatus as claimed in claim 2, wherein said first circuit comprises:
    a comparator which compares a voltage representing the power level of the reflected light with a voltage representing the reference level and outputs a comparison result; and
    an up/down counter which adjusts the second power level data based on the comparison result.

4. The apparatus as claimed in claim 2, wherein the second circuit further comprises a digital to analog converter which outputs the power level signal as an analog quantity.

5. The apparatus as claimed in claim 2, wherein the power applied to the laser diode is proportional to a length of the mark.

6. The apparatus as claimed in claim 2, wherein the discriminator includes a data table from which the first power level data is selected.

7. The apparatus as claimed in claim 6, further comprising a microcomputer which initializes the table values of the discriminator.

8. A method of adaptively controlling a power level of a laser diode in an apparatus for recording information on a recording medium, the method comprising:
    discriminating at least one of a mark size and a relationship between preceding and following spaces of input data and accordingly outputting first power level data to set the power level of the laser diode proportional to the mark size in a range including 3T and 14T;
    applying an optical signal from the laser diode to the recording medium at a power level corresponding to the first power level data;
    comparing a level of an optical signal, reflected from the recording medium during the applying of the optical signal to the recording medium, with a reference value and outputting a counted value based on the comparison;
    differentiating the first power level data from the counted value and outputting second power level data; and
    adjusting the power level of the laser diode to a power level corresponding to a sum of the first and second power level data.

* * * * *